United States Patent [19]
Watanabe

[11] Patent Number: 5,424,352
[45] Date of Patent: Jun. 13, 1995

[54] HEAT-CONDUCTIVE SILICONE RUBBER COMPOSITION

[75] Inventor: Satoshi Watanabe, Tokyo, Japan

[73] Assignee: Toshiba Silicone Co., Ltd., Tokyo, Japan

[21] Appl. No.: 215,721

[22] Filed: Mar. 22, 1994

[30] Foreign Application Priority Data

Mar. 23, 1993 [JP] Japan .................. 5-063832

[51] Int. Cl.$^6$ .............................................. C08K 3/22
[52] U.S. Cl. ..................................... 524/433; 524/779
[58] Field of Search ................................. 524/433, 779

[56] References Cited

U.S. PATENT DOCUMENTS 4,585,743 4/1986 Yamamoto et al. ............... 501/108
5,021,494 6/1991 Toya .................................... 524/433

FOREIGN PATENT DOCUMENTS 61-85474 5/1986 Japan ......................... C08L 101/00
2212314 8/1990 Japan ............................. C01F 5/08

OTHER PUBLICATIONS

Information of Polymer Technology & Polymer Industry, Profile, vol. 29, 1992.
Information of Polymer Technology & Polymer Industry, Profile, vol. 30, No. 346, 1993.

*Primary Examiner*—Melvyn I. Marquis
*Attorney, Agent, or Firm*—Sughrue, Mion, Zinn, Macpeak & Seas

[57] ABSTRACT

A heat-conductive silicone rubber composition compounded with magnesium oxide obtained by a dead burning method, wherein the magnesium oxide comprises magnesium oxide having specific properties and/or which is obtained from a water-soluble magnesium salt and an alkaline material in a specific method. The silicone rubber composition has excellent heat conductivity and workability.

24 Claims, No Drawings

HEAT-CONDUCTIVE SILICONE RUBBER COMPOSITION

FIELD OF THE INVENTION

The present invention relates to a silicone rubber composition having excellent heat conductivity and workability.

BACKGROUND OF THE INVENTION

Recently, with the small-sizing or miniaturizing tendency of electric parts or electronic parts, the necessity of efficiently radiating heat generated during the working of these parts to stabilize the parts by lowering the working temperature thereof and prevent the parts from being thermally deteriorated, has been more and more increased. For example, frequently a radiating fin made of a metal is fixed to a part radiating a large amount of heat, such as a power transistor and a diode, and in the case of assembling them, it has been the practice to interpose a radiating sheet comprising a rubber sheet having an electrically insulating property and also a good heat conductivity between them in order to efficiently perform the heat conduction. By fixing such a radiating sheet by applying a proper pressure, air existing between the surfaces of solids is excluded, whereby the heat conduction can be surely attained. When such a radiating sheet is not interposed, the heat conductivity of the electric parts or electronic parts themselves becomes an important characteristic.

Hitherto, a silicone rubber composition which becomes a rubber elastomer by being cured is well known and the silicone rubber composition has been widely used as potting materials for electric and electronic parts, coating materials, molding materials for mold forming, materials for electric wires, etc., by utilizing its excellent properties such as a weather resistance, a heat resistance, a cold resistance, an electrically insulating property, etc. Further, it is general practice to use the silcone rubber composition rendered heat conductive by compounding the silicone rubber composition with various heat-conductive materials. Alumina, aluminum nitride, boron nitride, ground qualtz, etc., are known as the heat-conductive material, but since most of the heat-conductive materials have a high Mohs' hardness, there are problems that a metal surface of a kneader (e.g., a Banbury mixer and a roll mixer) used at compounding the heat-conductive material is injured by the heat-conductive material, and when the heat-conductive material is mixed in large amounts with the silicone rubber composition, the rubber elasticity of the silicone rubber composition is lost, or the heat resistance of the composition is lowered.

Magnesium oxide is also used as the heat-conductive material and since the Mohs' hardness of magnesium oxide is 6, which is lower than those of the above-described other heat-conductive materials, the problems described above at compounding it with the silicone rubber composition do not occur. However, magnesium oxide has the substantial defect that magnesium oxide is hydrated with water or moisture with the passage of time and converted into magnesium hydroxide. Accordingly, when magnesium oxide is compounded with the silicone rubber composition as a heat-conductive material, the physical properties and the electric characteristics of the composition deteriorate, and thus it is difficult to say that magnesium oxide can be used in such system without feat of such deterioration occurring.

To avoid such problem, a method of burning magnesium oxide at a temperature of from 1,600° C. to less than the melting point thereof is proposed as described in JP-A-61-85474 (the term "JP-A" as used herein means an "unexamined published Japanese patent application"). However, the method has the problem that single crystals of magnesium oxide are broken, various lattice defects occur on the surfaces of the crystals by the action of water or moisture, the form thereof becomes amorphous, and it is impossible to compound large amounts of such magnesium oxide with a silicone rubber composition.

Thus, a silicone rubber composition having a high heat conductivity is not obtained by the conventional techniques.

SUMMARY OF THE INVENTION

Accordingly, an object of the present invention is to overcome the problems described above and to provide a silicone rubber composition having a high heat conductivity and good heat resistance and workability.

As a result of various investigations to attain the object described above, it has been found that in a heat-conductive silicone rubber composition compounded with magnesium oxide obtained by a dead burning method, when the magnesium oxide comprises magnesium oxide having a BET specific surface area of from 0.5 to 5.0 m$^2$/g and an apparent specific gravity of from 0.45 to 1.15 g/ml and/or magnesium oxide obtained by synthesizing magnesium hydroxide by reacting 1 equivalent of a water-soluble magnesium salt and not more than 0.95 equivalent of an alkaline material followed by granulating and drying, and then burning the granulated and dried magnesium hydroxide at a temperature of from 1,100° to 1,600° C., a silicone rubber composition having a selectively and specifically high heat conductivity and good heat resistance and workability can be obtained.

By compounding fine magnesium oxide having a primary particle size, such as magnesium oxide having the above-described characteristics or magnesium oxide produced by the above-described specific method, with an elastomer, the magnesium oxide particles aggregate together to result in a poor dispersion, whereby the elastomer is unsuitable for practical use, and hence it has been considered that such magnesium oxide is suitable for compounding with general resins but is unsuitable for an elastomer. However, it has been found that when the above-described fine magnesium oxide is compounded with a silicone rubber having a very low molecular cohesive energy as compared with general elastomers, the aggregation of the particles does not occur and a good compounded composition is obtained. The present invention has been accomplished based on this finding.

According to one embodiment of the present invention, there is provided a heat-conductive silicone rubber composition compounded with magnesium oxide obtained by a dead burning method, wherein the magnesium oxide comprises magnesium oxide having a BET specific surface area of from 0.5 to 5.0 m$^2$/g and an apparent specific gravity of from 0.45 to 1.15 g/ml.

According to another embodiment of the present invention, there is provided a heat-conductive silicone rubber composition compounded with magnesium oxide obtained by a dead burning method, wherein the magnesium oxide comprises magnesium oxide obtained by synthesizing magnesium hydroxide by reacting 1 equivalent of a water-soluble magnesium salt and not more than 0.95 equivalent of an alkaline material followed by granulating and drying, and then burning the granulated and dried product at a temperature of from 1,100° to 1,600° C.

According to still another embodiment of the present invention, there is provided a heat-conductive silicone rubber composition compounded with magnesium oxide obtained by a dead burning method, wherein the magnesium oxide comprises magnesium oxide having a BET specific area of from 0.5 to 5.0 m$^2$/g and an apparent specific gravity of from 0.45 to 1.15 g/ml and which is obtained by synthesizing magnesium hydroxide by reacting 1 equivalent of a water-soluble magnesium salt and not more than 0.95 equivalent of an alkaline material followed by granulating and drying, and then burning the granulated and dried product at a temperature of from 1,100° to 1,600° C.

DETAILED DESCRIPTION OF THE INVENTION

The present invention is described in detail below.

The heat-conductive silicone rubber composition of the present invention fundamentally comprises (A) a polyorganosiloxane composition which becomes a rubber elastomer by being cured at normal temperature or by heating, etc., containing (B) magnesium oxide obtained by a dead burning method.

The organosiloxane composition of component (A) comprises (a) a polyorganosiloxane base polymer having uniformly dispersed therein (b) a curing agent and, if necessary, various additives. In the various components used for the polyorganosiloxane composition, (a) the polyorganosiloxane base polymer and (b) the curing agent are the components which are properly selected according to the reaction mechanism for obtaining a rubber elastomer. As the reaction mechanism, (1) a crosslinking method with an organic peroxide vulcanizing agent, (2) a method by a condensation reaction, (3) a method by an addition reaction, etc., are known and it is well known that a preferred combination of the component (a) and the component (b), i.e., a curing catalyst or a crosslinking agent, is determined according to the kind of the reaction mechanism.

An organic group in the polyorganosiloxane as the base polymer as the component (a) used in these various reaction mechanisms is a monovalent substituted or unsubstituted hydrocarbon group, and examples thereof are unsubstituted hydrocarbon groups, e.g., alkyl groups such as methyl, ethyl, propyl, butyl, hexyl, dodecyl, etc.; aryl groups such as phenyl, etc.; aralkyl groups such as β-phenylethyl, β-phenylpropyl, etc.; and substituted hydrocarbon groups such as chloromethyl, 3,3,3-trifluoropropyl, etc. In addition, methyl is generally used from the view of ease of the synthesis of the polyorganosiloxane.

The polyorganosiloxane base polymer (a) and the curing agent (b) in each of the reaction mechanisms (1) to (3) described above are described below.

First, in the case of applying the crosslinking method (1), a polyorganosiloxane wherein at least two of the organic groups bonded to the silicon atom in one molecule are an alkenyl group such as vinyl, propenyl, butenyl, hexenyl, etc., is used as the base polymer for the component (a). In particular, from the points of ease of synthesis of the base polymer and the ease of availability of the raw material, a vinyl group is preferable in the above-described groups.

Further, various organic peroxide vulcanizing agents such as benzoyl peroxide, 2,4-dichlorobenzoyl peroxide, dicumyl peroxide, cumyl-t-butyl peroxide, 2,5-dimethyl-2,5-di-t-butylperoxyhexane, di-t-butyl peroxide, etc., are used as the curing agent for the component (b), and in particular, from the point of imparting a low compression set to the silicone rubber composition, dicumyl peroxide, cumyl-t-butyl peroxide, 2,5-dimethyl-2,5-di-t-butylperoxyhexane, and di-t-butyl peroxide are preferred. Those organic peroxide vulcanizing agents are used alone or as a mixture thereof.

The amount of the organic peroxide used, which is the curing agent as the component (b), preferably ranges from 0.05 to 15 parts by weight per 100 parts by weight of the polyorganosiloxane base polymer as the component (a). If the amount of the organic peroxide used is less than 0.05 parts by weight, the vulcanization is not sufficiently conducted and if the amount thereof is over 15 parts by weight, a further specific effect by increasing the amount thereof is not obtained and the organic peroxide added in too great an amount sometimes adversely affects the properties of the silicone rubber composition obtained.

In the case of applying the condensation reaction (2), a polyorganosiloxane having a hydroxyl group at both terminals thereof is used as the base polymer for the component (a).

Examples of the curing agent as the component (b) are alkoxy-type crosslinking agents such as ethyl silicate, propyl silicate, methyltrimethoxysilicate, vinyltrimethoxysilane, methyltriethoxysilane, vinyltriethoxysilane, methyltris(methoxyethoxy)silane, vinyltris(methoxyethoxy)silane, methyltripropenoxysilane, etc.; acetoxy-type crosslinking agents such as methyltriacetoxysilane, vinyltriacetoxysilane, etc.; other crosslinking agents such as methyltri(acetoxime)silane, vinyltri(acetoxime)silane, methyltri(methylethylketoxime)silane, vinyltri(methylethylketoxime)silane, etc.; and the partially hydrolyzed products thereof. Other examples of the crosslinking agents as the curing agent are cyclic siloxanes such as hexamethyl-bis(diethylaminoxy)cyclotetrasiloxane, tetramethyldibutyl-bis(diethylaminoxy)cyclotetrasiloxane, heptamethyl(diethylaminoxy)cyclotetrasiloxane, pentamethyltris(diethylaminoxy)cyclotetrasiloxane, hexamethyl-bis(methylethylaminoxy)cyclotetrasiloxane, tetramethyl-bis(diethylaminoxy)mono(methylethylaminoxy)cyclotetracyloxane, etc.

As described above, the crosslinking agent used as the curing agent may be of the silane structure or the siloxane structure, and the siloxane structure may be a straight chain structure, a branched structure, or a cyclic structure. Furthermore, they may be used alone or as a mixture thereof.

Of the curing agents as the component (b), metal carboxylates such as iron octoate, cobalt octoate, manganese octoate, tin naphthenate, tin caprylate, tin oleate, etc., and organotin compounds such as dimethyltin dioleate, dimethyltin dilaurate, dibutyltin dioleate, diphenyltin diacetate, dibutyltin oxide, dibutyltin dimethoxide, dibutyl-bis-(triethoxysiloxy)tin, dioctyltin dilaurate, etc., are used as the curing catalyst.

In the curing agent as the component (b), the amount of the crosslinking agent used is preferably from 0.1 to 20 parts by weight per 100 parts of the base polymer as the component (a). If the amount of the crosslinking agent used is less than 0.1 part by weight, a sufficient strength is not obtained for the rubber after curing and if the amount thereof is over 20 parts by weight, the rubber obtained becomes brittle and cannot endure practical use. Further, the amount of the curing catalyst used is preferably from 0.01 to 5 parts by weight per 100 parts by weight of the base polymer as the component (a). If the amount thereof is less than 0.01 part by weight, the function as the curing catalyst is insufficient, whereby it requires a long time to complete curing and also curing in the inside far from a contact surface with air becomes insufficient. On the other hand, if the amount of the curing catalyst is over 5 parts by weight, the storage stability is decreased. The more preferred amount of the curing catalyst used is from 0.1 to 3 parts by weight.

In the case of applying the addition reaction (3), the same materials as the base polymers in the crosslinking method (1) described above are used as the base polymer for the component (a). Further, as the curing agent for the component (b), platinum catalysts such as chloroplatinic acid, a platinum olefin complex, a platinum vinylsiloxane complex, platinum black, a platinum triphenylphosphine complex, etc., are used as the curing catalyst and an organosiloxane having at least 2 hydrogen atoms bonded to the silicon atom in the molecule is used as the crosslinking agent.

In the curing agents as the component (b), the amount of the curing catalyst used is preferably from 1 to 1,000 ppm in terms of platinum per 100 parts by weight of the base polymer as the component (a). If the amount of the curing catalyst used is less than 1 ppm in terms of platinum, curing does not sufficiently proceed and if the amount thereof is over 1,000 ppm, the improvement on the curing speed, etc., by the increase of the amount thereof cannot be expected. Further, the amount of the crosslinking agent as the component (b) used is such that the amount of the hydrogen atoms bonded to the silicon atoms in the crosslinking agent becomes preferably from 0.5 to 4.0 atoms, and more preferably from 1.0 to 3.0 atoms, per one alkenyl group in the component (a). If the amount of the hydrogen atoms is less than 0.5, curing of the composition does not sufficiently proceed and the hardness of the composition after curing becomes low, and if the amount of the hydrogen atoms is over 4.0, the physical properties and the heat resistance of the composition after curing are decreased.

In the heat-conductive silicone rubber composition of the present invention, there are no particular restrictions on the curing mechanism and the polysiloxane base polymer described above, but from the point of the heat-conductive characteristics, the addition reaction (3) or the crosslinking method (1) by the organic peroxide vulcanization is preferred as the curing mechanism. Further, a polysiloxane base polymer having a degree of polymerization of at least 1,000, i.e., the so-called millable-type polysiloxane base polymer, is preferred. This is supposed to be due to the fact that since the shearing stress at mixing is proper, the effect described above is obtained by compounding the curing agent.

Magnesium oxide (hereinafter referred to as "MgO") is industrially produced by reacting an alkaline material with sea water as a raw material to form magnesium carbonate, etc., and then burning the reaction product. From the burning temperature at the production thereof, MgO is largely classified into light burned MgO (burned at about 600° C. to 900° C.) and dead burned MgO (burned at about 1,100° C. to 1,600° C.). MgO used as a heat resistant filler and a heat-conductive agent is the latter dead burned MgO. The reason thereof is that dead burned MgO has a melting point of about 2,800° C.

MgO used in the present invention is obtained by the dead burning method. The MgO comprises magnesium oxide having a BET specific surface area of from 0.5 to 5.0 $m^2/g$ and an apparent specific gravity of from 0.45 to 1.15 g/ml and/or which is produced by reacting 1 equivalent of a water-soluble magnesium salt (e.g., magnesium chloride and magnesium nitrate) and not more than 0.95 equivalent of an alkaline material (e.g., calcium hydroxide, ammonia, sodium hydroxide, and potassium hydroxide) in an aqueous medium such as an aqueous calcium chloride solution at a relatively low temperature (not higher than 40° C.) followed by heating the reaction product to a temperature of from about 50° C. to 120° C. to synthesize magnesium hydroxide, granulating and drying magnesium hydroxide by a spray dryer, etc., and burning the granulated and dried product at a temperature of from 1,100° C. to 1,600° C.

The amount of such a specific magnesium oxide having the above-described specific properties and/or which is obtained by the above-described specific method is about 50% by weight or more, preferably 75% by weight or more, and more preferably 90% by weight or more, based on the weight of the sum of the MgO.

That magnesium oxide which has a BET specific area of from 0.5 to 5.0 $m^2/g$ means that the primary particle size thereof is greatly small in MgO for rubber compounding and is in a state of having almost no fine pores at the surface thereof and even when secondary particles are formed, the surface does not substantially have fine pores.

That magnesium oxide which has an apparent specific gravity of from 0.45 to 1.15 g/ml means that the magnesium oxide belongs to a heavy kind in MgO for rubber compounding, secondary particles are not substantially formed since the surface activity is not high and even when secondary particles are formed, they are in a simple form (near spherical form).

Further, magnesium oxide produced by reacting 1 equivalent of a water-soluble magnesium salt (e.g., magnesium chloride and magnesium nitrate) and 0.95 equivalent of an alkaline material (e.g., calcium hydroxide, ammonia, sodium hydroxide, and potassium hydroxide) in an aqueous medium such as an aqueous calcium chloride solution at a relatively low temperature (not higher than 40° C.) followed by heating the reaction product to a temperature of from about 50° C. to 120° C. to synthesize magnesium hydroxide, granulating and drying magnesium hydroxide by a spray dryer, etc., and then burning the granulated and dried product at a temperature of from 1,100° C. to 1,600° C. has large specificities in the limitation on the equivalent of the alkaline material used in the above-described reaction and the temperature conditions in the reaction and heating steps as compared with MgO produced by a conventional dead burning method.

The more detailed production method of MgO used in the present invention is described in, e.g., JP-A-2-212314 and also can be obtained as commercially available products (e.g., "Pyrokisuma 3320" and "Pyrokisuma 5301" trade names, made by Kyowa Kagaku Kogyo K.K.). (cf. Information of Polymer Technology & Polymer Industry, Polyfile, vol. 29, 1992 and vol. 30, No. 346, 1993)

MgO used in the present invention preferably has a particle size distribution such that the particles having a particle size of 5 μm or less are at least 90% by weight, and MgO having a particle size distribution such that the particles having a particle size of 2 μm or less are at least 50% by weight is particularly preferable.

There is no particular restriction on the amount of MgO used in the present invention but the compounding amount thereof is usually from 10 to 1,000 parts by weight, and preferably from 100 to 600 parts by weight, per 100 parts by weight of the polysiloxane base polymer.

It is most preferred that the MgO used in the present invention is surface treated with a silane coupling agent. In particular, use of the surface treated MgO markedly improves resistance to compression set.

The surface treatment method may comprises preparing MgO so as to satisfy the requirements of the present invention, and subjecting the same to a silane treatment, or synthesizing MgO, subjecting the same to a silane treatment, and then subjecting the silane treated MgO to secondary granulation and classification. The former method includes simple steps and therefore is economical. Further, MgO may be agained burned during or after the silane treatment, thereby integrally bonding the MgO and a coupling agent with a chemical affinity. In general, the surface-treated MgO can be obtained by adding a silane coupling agent to MgO secondarily prepared so as to satisfy the requirements of the present invention, and kneading the mixture with a conventional stirring means such as a Henschel mixer at normal temperature.

Examples of the silane coupling agent which can be used include vinyl trichlorosilane, vinyl triethoxysilane, vinyl trimethoxysilane, 3-chloropropyl trimethoxysilane, 3-chloropropylmethyl dichlorosilane, 3-chloropropylmethyl diethoxysilane, 3-chloropropylmethyl dimethoxysilane, 3-chloropropyl triethoxysilane, 3-aminopropyl triethoxysilane, N-(2-aminoethyl)-3-aminopropylmethyl dimethoxysilane, N-(2-aminoethyl)-3-aminopropyl trimethoxysilane, 3-glycidoxypropyl trimethoxysilane, 3-glycidoxypropylmethyl dimethoxysilane, 3-methacryloxypropyl trimethoxysilane, 3-methacryloxypropylmethyl dimethoxysilane, and 3-mercaptopropyl trimethoxysilane.

Those silane coupling agents may be used alone or in any combinations thereof according to the necessary characteristics of a silicone rubber required.

The silane coupling agent is added in an amount of from 0.1 to 5.0% by weight, and preferably from 0.2 to 1.5% by weight, based on the weight of the MgO to be treated.

The amino group-containing silane coupling agent is liable to color slightly. Therefore, it is desirable to avoid use thereof color is important.

In addition, the heat-conductive silicone rubber composition of the present invention may, if desired, further be compounded with various additives such as a reinforcing filler, a heat resistance-improving agent, a flame retardant, etc. Examples of these additives are conventional reinforcing fillers such as fumed silica, precipitated silica, diatomaceous earth, etc.; and also aluminum oxide, mica, clay, zinc carbonate, glass beads, polysilsesquioxane, polydimethylsiloxane, alkenyl group-containing polysiloxane, etc.

The present invention is explained in more detail by reference to the following examples. All parts in these examples and comparative examples are by weight unless otherwise indicated.

EXAMPLE 1 AND COMPARATIVE EXAMPLE 1

Synthesis of MgO

Magnesium hydroxide was obtained by reacting 1 equivalent of magnesium chloride and 0.90 equivalent of calcium hydroxide, and the magnesium hydroxide thus obtained was granulated and dried, and the granulated and dried product was burned at about 1,100° C. to obtain magnesium oxide.

By subjecting magnesium oxide thus obtained to a powder processing step, magnesium oxixde (MgO-A) having a BET specific surface area of 1.4 m$^2$/g and an apparent specific gravity of 0.56 g/ml was obtained. For the sake of comparison, magnesium oxide (MgO-B) having a BET specific surface area of 5.2 m$^2$/g and an apparent specific gravity of 1.16 g/ml was obtained by a powder secondary controlling step.

In a kneader were charged 100 parts of polydimethylsiloxane (degree of polymerization: about 6,000) containing 0.15 mol % of a methylvinylsiloxane unit the terminal of which was blocked with a trimethylsilyl group and 100 parts of the above-obtained MgO-A or MgO-B as a heat conductive filler followed by kneading and after they were compounded well, the mixture was taken out from the kneader. By uniformly mixing the mixture with 0.5 part of 2,5-dimethyl-2,5-di-t-butylperoxyhexane as a crosslinking agent, heat-conductive silicone rubber compositions were thus prepared.

For comparing the workabilities of both the compositions, the sheeting characteristics and the extruding characteristics of each composition were evaluated as follows.

(1) Sheeting Characteristics

The sheeting possible thickness of each composition by two rolls was measured.

(2) Extruding characteristics

Each composition was extruded by a screw extruding machine having a diameter of 35 mm and L/D of 14 into a tube having an outer diameter of 12 mm and an inner diameter of 8 mm, and the maximum moldable line velocity (m/minute) was measured.

The results obtained are shown in Table 1 below.

In addition, the heat conductivity of both the heat-conductive silicone rubber compositions was 1.1 [cal/cm·second·° C.].

TABLE 1

|  | Example 1 | Comparative Example 1 |
|---|---|---|
| Sheeting Characteristics (μm) | 30 | 480 |
| Extruding Characteristics (m/min) | 82 | 13 |

EXAMPLES 2 AND 3, AND COMPARATIVE EXAMPLE 2

Synthesis of MgO

Magnesium hydroxide was obtained by reacting 1 equivalent of magnesium chloride and 0.90 equivalent of calcium hydroxide, and the magnesium hydroxide thus obtained was granulated and dried, and by burning the granulated and dried product at about 1,100° C., magnesium oxide was obtained.

By subjecting the magnesium oxide thus obtained to a powder secondary controlling step, magnesium oxide (MgO-C) having a BET specific surface area of 1.5

$m^2/g$ and an apparent specific gravity of 0.60 g/ml was obtained.

100 Parts of MgO-C obtained above and 1.5 parts of vinyltriethoxysilane as a silane coupling agent were charged in a Henschel mixer and a surface treatment was conducted to obtain magnesium oxide (MgO-D). The same surface treatment as above was applied to MgO-B to obtain comparative magnesium oxide (MgO-E).

Using each of those MgOs, of silicone rubber compositions for a heat roller which is used for PPC (a plain paper copying machine) was prepared as follows. The physical properties particularly required for the heat roller are a low hardness and a low compression set.

100 Parts of polydimethylsiloxane (degree of polymerization: 6,000) containing 0.23 mol of a methylvinylsiloxane unit the terminal of which was blocked with a trimethylsilyl group and 100 parts of MgO-C, MgO-D, or MgO-E obtained above as a heat-conductive filler were charged in a kneader followed by kneading and after compounding well, the mixture was taken out of the kneader. By uniformly mixing each of the mixtures thus obtained with 0.4 part of 2,5-dimethyl-2,5-di-t-butylperoxyhexane as a crosslinking agent, each of heat-conductive silicone compositions were thus prepared. Using each of the compositions, each test piece for testing the hardness and the compression set defined by JIS K 6301 (vulcanized rubber physical test method) was prepared by a press vulcanizaton at 170° C.×10 minutes, and after further applying thereto a secondary vulcanization for 4 hours in an oven at 200° C., the properties thereof were measured.

Using each of the above heat-conductive rubbery silicone compositions, a heat roll having an outer diameter of 25 mm, a thickness of 6.5 mm, and a length of 33 cm was formed on the outer surface of a core metal made of SUS 304 having a diameter of 12 mm by press molding (170° C.×12 minutes).

A heater was connected to the core metal such that the surface temperature of each heat roller thus formed always became 160° C., a continuous operation test was conducted using a copy paper of an A4 size (210 mm×297 mm), and the total performance was compared by the number of sheets until continuous paper passing became impossible. As a result thereof, the average value of the simultaneous tests using three testers is shown in Table 2 below as the two figures of the effective number. In addition, the impossibility of paper passing easily occurs mainly due to the unevenness of the 0.1 mm unit of the outside diameter of the heat roll and the dispersion of the μ second unit of the nip recovering time.

These results are shown in Table 2 below.

TABLE 2

|  | Example 2 | Example 3 | Comparative Example 2 |
|---|---|---|---|
| Hardness* | 42 | 43 | 52 |
| Compression Set (180 C. × 22 hours, 25% Compression Condition) | 18 | 1 | 19 |
| Heat Conductivity (cal/cm · sec. °C.) | $1.2 \times 10^{-3}$ | $1.3 \times 10^{-3}$ | $1.0 \times 10^{-3}$ |
| Paper passing Test (the number of sheets) | 660,000 | 720,000 | 38,000 |

*According to JIS K 6301, Spring type hardness test (Type A)

EXAMPLES 4 TO 7, AND COMPARATIVE EXAMPLE 3 TO 6

Synthesis of MgO

Magnesium hydroxide was obtained by reacting 1 equivalent of magnesium chloride and 0.75 equivalent of calcium hydroxide followed by granulating and drying, and the granulated and dried magnesium hydroxide product was burned at about 1,200° C. to obtain magnesium oxide.

By subjecting the magnesium oxide thus obtained to a powder processing step, magnesium oxide having a BET specific surface area of 1.1 $m^2/g$ and an apparent specific gravity of 0.72 g/ml was obtained. From the magnesium oxide thus obtained, magnesium oxide having a particle size distribution range of from 0.01 to 50.0 μm (MgO-F) and magnesium oxide having a particle size distribution range of from 0.01 to 60.0 μm (MgO-G) were obtained using a particle size classifier.

0.5 Part of 3-aminopropyltriethoxysilane was added to 100 parts of the each of MgO-F and MgO-G obtained above and a surface treatment was applied thereto by kneading each mixture with a heat-stirrer to obtain MgO-H and MgO-I, respectively.

Comparative products were prepared as follows. That is, by following the same procedure as above, magnesium oxide having a BET specific surface area of 0.45 $m^2/g$ and an apparent specific gravity of 0.40 g/ml was obtained. From The magnesium oxide thus obtained, magnesium oxide having a particle size distribution range of from 0.01 to 50.0 μm (MgO-J) and magnesium oxide having a particle size distribution range of from 0.01 to 60.0 μm (MgO-K) were obtained using a particle size classifier.

0.5 Part of 3-aminopropyltriethoxysilane was added to 100 parts of the each of MgO-J and MgO-K obtained above and a surface treatment was applied thereto by kneading each mixture by a heat-stirrer to obtain comparative products, MgO-L and MgO-M, respectively.

Using those MgOs, it was attempted to prepare silicone rubber compositions showing a good tensile strength and a good elongation and having a high heat conductivity even when the amount of MgO added was decreased.

That is, 100 parts of polymethylsiloxane (degree of polymerization: about 6,000) containing 0.15 mol of a methylvinylsiloxane unit the terminal of which was blocked with a trimethylsilyl group and 150 parts of each of the above-obtained MgO-F to MgO-M as a heat-conductive filler were charged in a kneader followed by kneading to obtain each compounded product. After compounding each of the compounded products with 2 parts of polymethylhydrogensiloxane and an isopropyl alcohol solution of chloroplatinic acid in an amount of 10 ppm in terms of a platinum atom, test pieces for testing the tensile strength, the elongation, the hardness, and the compression set were prepared using each of the compounded mixtures according to the method of JIS K 6301 (vulcanized rubber physical test method).

The heat conductivity of each test piece was also measured. The vulcanization conditions were a press vulcanization at 170° C.×10 minutes and a secondary vulcanization at 1 hour in a constant-temperature bath at 200° C.

The results obtained are shown in Table 3 below.

TABLE 3

| | Example | | | | Comparative Example | | | |
|---|---|---|---|---|---|---|---|---|
| | 4 | 5 | 6 | 7 | 3 | 4 | 5 | 6 |
| Vinyl-Containing Polysiloxane (part) | 100 | 100 | 100 | 100 | 100 | 100 | 100 | 100 |
| MgO-F (part) | 150 | — | — | — | — | — | — | — |
| MgO-G (part) | — | 150 | — | — | — | — | — | — |
| MgO-H (part) | — | — | 150 | — | — | — | — | — |
| MgO-I (part) | — | — | — | 150 | — | — | — | — |
| MgO-J (part) | — | — | — | — | 150 | — | — | — |
| MgO-K (part) | — | — | — | — | — | 150 | — | — |
| MgO-L (part) | — | — | — | — | — | — | 150 | — |
| MgO-M (part) | — | — | — | — | — | — | — | 150 |
| P.M.H.S.* (part) | 2 | 2 | 2 | 2 | 2 | 2 | 2 | 2 |
| I.P.A. soln** of Chloroplatinic Acid (ppm) | 10 | 10 | 10 | 10 | 10 | 10 | 10 | 10 |
| Tensile Strength (kgf/cm$^2$) | 59 | 53 | 63 | 60 | 22 | 28 | 19 | 21 |
| Elongation (%) | 500 | 472 | 420 | 400 | 180 | 130 | 140 | 100 |
| Hardness (JIS-A) | 52 | 57 | 53 | 59 | 65 | 68 | 70 | 73 |
| Compression Set (%) | 14 | 11 | 1 | 2 | 19 | 18 | 23 | 20 |
| Heat Conductivity [cal/cm · sec · °C.] | 2.2 | 1.8 | 2.2 | 1.8 | 1.2 | 1.1 | 0.9 | 0.7 |

(*): Polymethylhydrogensiloxane.
(**): Isopropyl alcohol solution.

While the invention has been described in detail and with reference to specific examples thereof, it will be apparent to one skilled in the art that various changes and modifications can be made therein without departing from the spirits and scope thereof.

What is claimed is:

1. A heat-conductive silicone rubber composition comprising
    (A) a polyorganosiloxane composition which becomes a rubber elastomer by being cured at room temperature or by heating, which comprises
        (a) a polyorganosiloxane base polymer, and
        (b) a curing agent uniformly dispersed therein, and
    (B) magnesium oxide obtained by a dead burning method compounded with (A), wherein said magnesium oxide comprises magnesium oxide having a BET specific surface area of from 0.5 to 5.0 m$^2$/g and an apparent specific gravity of from 0.45 to 1.15 g/ml.

2. A heat-conductive silicone rubber composition as claimed in claim 1, wherein said magnesium oxide has a particle size distribution range that the particles thereof having a particle size of 5 μm or less are at least 90% by weight.

3. A heat-conductive silicone rubber composition as claimed in claim 1, wherein said magnesium oxide has a particle size distribution range that the particles thereof having a particle size of 2 μm or less are at least 50% by weight.

4. A heat-conductive silicone rubber composition as claimed in claim 1, wherein the magnesium oxide having the BET specific surface area and the apparent specific gravity is present in an amount of about 50% by weight or more based on the weight of the sum of the magnesium oxide.

5. A heat-conductive silicone rubber composition as claimed in claim 1, wherein the magnesium oxide having the BET specific surface area and the apparent specific gravity is present in an amount of about 75% by weight or more based on the weight of the sum of the magnesium oxide.

6. A heat-conductive silicone rubber composition as claimed in claim 1, wherein the magnesium oxide having the BET specific surface area and the apparent specific gravity is present in an amount of about 90% by weight or more based on the weight of the sum of the magnesium oxide.

7. A heat-conductive silicone rubber composition comprising
    (A) a polyorganosiloxane composition which becomes a rubber elastomer by being cured at room temperature or by heating, which comprises
        (a) a polyorganosiloxane base polymer, and
        (b) a curing agent uniformly dispersed therein, and
    (B) magnesium oxide obtained by a dead burning method compounded with (A), wherein said magnesium oxide comprises magnesium oxide obtained by synthesizing magnesium hydroxide by reacting 1 equivalent of at least one water-soluble magnesium salt selected from the group consisting of magnesium chloride and magnesium nitrate, and not more than 0.95 equivalent of at least one alkaline material selected from the group consisting of calcium hydroxide, ammonia, sodium hydroxide and potassium hydroxide followed by granulating and drying the magnesium hydroxide, and burning the granulated and dried product at a temperature of from 1,100 to 1,600° C.

8. A heat-conductive silicone rubber composition as claimed in claim 7, wherein said magnesium oxide has a particle size distribution range that the particles thereof having a particle size of 5 μm or less are at least 90% by weight.

9. A heat-conductive silicone rubber composition as claimed in claim 7, wherein said magnesium oxide has a particle size distribution range that the particles thereof having a particle size of 2 μm or less are at least 50% by weight.

10. A heat-conductive silicone rubber composition as claimed in claim 7, wherein the magnesium oxide obtained by the method is present in an amount of about 50% by weight based on the weight of the sum of the magnesium oxide.

11. A heat-conductive silicone rubber composition as claimed in claim 7, wherein the magnesium oxide obtained by the method is present in an amount of about 75% by weight based on the weight of the sum of the magnesium oxide.

12. A heat-conductive silicone rubber composition as claimed in claim 7, wherein the magnesium oxide obtained by the method is present in an amount of about 90% by weight based on the weight of the sum of the magnesium oxide.

13. A heat-conductive silicone rubber composition comprising
    (A) a polyorganosiloxane composition which becomes a rubber elastomer by being cured at room temperature or by heating., which comprises
        (a) a polyorganosiloxane base polymer, .and
        (b) a curing agent uniformly dispersed therein, and (B) magnesium oxide obtained by a dead burning method compounded with (A), wherein said magnesium oxide comprises magnesium oxide having a BET specific surface area of from 0.5 to 5.0 m²/g and an apparent specific gravity of from 0.45 to 1.15 g/ml and which is obtained by synthesizing magnesium hydroxide by reacting 1 equivalent of at least one water-soluble magnesium salt selected from the group consisting of magnesium chloride and magnesium nitrate, and not more than 0.95 equivalent of at least one alkaline material selected from the group consisting of calcium hydroxide, ammonia, sodium hydroxide and potassium hydroxide followed by granulating and drying the magnesium hydroxide, and burning the granulated and dried product at a temperature of from 1,100° to 1,600° C.

14. A heat-conductive silicone rubber composition as claimed in claim 12, wherein said magnesium oxide has a particle size distribution range that the particles thereof having a particle size of not larger than 5 μm are at least 90% by weight.

15. A heat-conductive silicone rubber composition as claimed in claim 13, wherein said magnesium oxide has a particle size distribution range that the particles thereof having a particle size of 2 μm or less are at least 50% by weight.

16. A heat-conductive silicone rubber composition as claimed in claim 13, wherein said magnesium oxide having a BET specific surface area and the apparent specific gravity and which is obtained by the method is present in an amount of about 50% by weight based on the weight of the sum of the magnesium oxide.

17. A heat-conductive silicone rubber composition as claimed in claim 13, wherein said magnesium oxide having a BET specific surface area and the apparent specific gravity and which is obtained by the method is present in an amount of about 75% by weight based on the weight of the sum of the magnesium oxide.

18. A heat-conductive silicone rubber composition as claimed in claim 13, wherein said magnesium oxide having a BET specific surface area and the apparent specific gravity and which is obtained by the method is present in an amount of about 90% by weight based on the weight of the sum of the magnesium oxide.

19. A heat-conductive silicone rubber composition as claimed in claim 1, wherein said polyorganosiloxane base polymer is an addition reaction curable polymer.

20. A heat-conductive silicone rubber composition as claimed in claim 1, wherein said polyorganosiloxane base polymer is a vulcanization curable polymer.

21. A heat-conductive silicone rubber composition as claimed in claim 7, wherein said polyorganosiloxane base polymer is an addition reaction curable polymer.

22. A heat-conductive silicone rubber composition as claimed in claim 7, wherein said polyorganosiloxane base polymer is a vulcanization curable polymer.

23. A heat-conductive silicone rubber composition as claimed in claim 13, wherein said polyorganosiloxane base polymer is an addition reaction curable polymer.

24. A heat-conductive silicone rubber composition as claimed in claim 13, wherein said polyorganosiloxane base polymer is a vulcanization curable polymer.

* * * * *